(12) United States Patent
Borgogelli et al.

(10) Patent No.: US 6,506,810 B2
(45) Date of Patent: Jan. 14, 2003

(54) USE OF MIXTURES OF ORGANOFUNCTIONALLY MODIFIED POLYSILOXANES WITH BRANCHED ALCOHOLS IN THE PRODUCTION OF FLEXIBLE POLYURETHANE FOAMS

(75) Inventors: Rob Borgogelli, Midlothian, VA (US); Oliver Eyrisch, Essen (DE)

(73) Assignee: Goldschmidt AG, Essen (DE)

( * ) Notice: Subject to any disclaimer, the term of this patent is extended or adjusted under 35 U.S.C. 154(b) by 0 days.

(21) Appl. No.: 09/995,082

(22) Filed: Nov. 26, 2001

(65) Prior Publication Data

US 2002/0132867 A1 Sep. 19, 2002

(30) Foreign Application Priority Data

Nov. 28, 2000 (DE) .......................................... 100 59 057

(51) Int. Cl.$^7$ ................................................. C08G 18/48
(52) U.S. Cl. .................. 521/110; 521/111; 521/112; 521/117; 521/122; 521/170; 521/174
(58) Field of Search ................ 528/25, 26, 31; 524/765; 521/170, 174, 110, 111, 112, 117, 122

(56) References Cited

U.S. PATENT DOCUMENTS

| | | |
|---|---|---|
| 2,846,458 A | 8/1958 | Haluska |
| 3,115,512 A | 12/1963 | Rossmy et al. |
| 3,346,554 A | 10/1967 | Patton et al. |
| 3,823,201 A | 7/1974 | Pizzini et al. |
| 3,850,861 A | 11/1974 | Fabris et al. |
| RE28,715 E | 2/1976 | Stamberger |
| 4,390,645 A | 6/1983 | Hoffman et al. |
| 4,431,754 A | 2/1984 | Hoffman |
| 4,454,255 A | 6/1984 | Ramlow et al. |
| 4,458,038 A | 7/1984 | Ramlow et al. |
| 4,520,160 A | 5/1985 | Brown |
| 4,550,194 A | 10/1985 | Reichel et al. |
| 5,321,051 A | 6/1994 | Burkhart et al. |
| 5,357,018 A | 10/1994 | Burkhart et al. |
| 5,985,948 A * | 11/1999 | Burkhart et al. ............. 521/112 |
| 6,245,824 B1 * | 6/2001 | Frey et al. .................. 521/112 |

FOREIGN PATENT DOCUMENTS

| | | |
|---|---|---|
| DE | 1 012 602 | 7/1957 |
| DE | 1 040 251 | 10/1958 |
| DE | 1 120 147 | 12/1961 |
| DE | 1 153 166 | 8/1963 |
| DE | 1 570 647 | 6/1970 |
| DE | 1 220 615 | 7/1996 |
| EP | 0 585 771 | 3/1994 |
| EP | 0 645 226 | 3/1995 |
| EP | 0 900 811 | 3/1999 |
| EP | 0 976 781 | 2/2000 |

* cited by examiner

Primary Examiner—John M. Cooney, Jr.
(74) Attorney, Agent, or Firm—Frommer Lawrence & Haug LLP

(57) ABSTRACT

The invention relates to the use of mixtures of organofunctionally modified polysiloxanes with branched alcohols in the production of flexible polyurethane foams.

13 Claims, No Drawings

USE OF MIXTURES OF ORGANOFUNCTIONALLY MODIFIED POLYSILOXANES WITH BRANCHED ALCOHOLS IN THE PRODUCTION OF FLEXIBLE POLYURETHANE FOAMS

RELATED APPLICATIONS

This application claim priority to German application No. 100 59 057.8, filed Nov. 28, 2000, herein incorporated by reference.

BACKGROUND OF THE INVENTION

1. Field of Invention

The invention relates to the use of mixtures of organofunctionally modified polysiloxanes with branched alcohols in the production of flexible polyurethane foams.

2. Description of Related Art

Polysiloxane-polyoxyalkylene block copolymers, hereinafter referred to as polyether siloxanes, are used in the production of polyurethane foams. They make it possible to obtain a uniform, fine pore structure and stabilize the foam during the production process.

However, depending on the production process and depending on what further raw materials are used, an unsatisfactory cell structure is obtained in some cases. For example, the use of polyols having a high polypropylene oxide content frequently tends to give a coarser cell structure.

The equipment used can also lead to an irregular or coarse cell structure, for example when using low-pressure mixing heads or when the raw materials are simply mixed by stirring at atmospheric pressure.

The use of alternative blowing agents, in particular $CO_2$, also places particularly high demands on the polyether siloxane in respect of achieving a fine-pored cell structure. Owing to the advantageous ecological balance, this liquid $CO_2$ technology has become increasingly important in the past years. In this process, pressurized $CO_2$ is used as blowing gas in addition to the $CO_2$ formed by chemical reaction of the isocyanates used with water. This technology is described, for example, in EP-A-0 645 226. However, the introduction of this technology has shown that the spontaneous foaming of the pressurized $CO_2$ on discharge of the reaction mixture places increased demands on the cell formation characteristics of the components used in the foam formulation. This can also be explained by the isocyanate/water reaction, which previously commenced slowly over a period of several seconds, leading only to slow saturation of the liquid phase with gas and thus the slow formation of gas bubbles, viz. the cream phase of the foam.

This previously slow process which forms the basis for the morphological properties, i.e. cell count and cell size distribution of the resulting foam is now compressed into fractions of a second, namely the time required by the raw materials to pass from the pressurized mixing bead of a foaming machine and the adjoining discharge device to the ambient pressures of one atmosphere. This results, in a manner similar to shaving foam from a spray can, to spontaneous formation of a foam due to vaporization of liquid $CO_2$. The defects which occurred in such foams were nonuniform, sometimes enlarged cells within the foam structure, and the use of suitable foam stabilizers can be useful for minimizing these defects. Nevertheless, there is often the problem, depending on boundary conditions (pressure, raw material temperatures, use of solids in the formulation), of stabilizers which are well-suited according to the present state of the art, e.g. as described in U.S. Pat No. 5,357,018 or U.S. Pat. No. 5,321,051, not producing fully defect-free foams.

In principle, the cell structure can be made finer by increasing the amount of polyether siloxane used, but there is limited latitude for achieving this increase, firstly because of the accompanying phenomenon of overstabilization which then occurs and can lead to a high proportion of closed cells, in extreme cases even to shrinkage of the foam, and secondly because of the associated unfavorable economics.

In principle, the use of additives to polyether siloxanes or flexible foam formulations for increasing the fineness of the cells is already known.

EP-A-0 900 811 describes the use of cyclic carbonates as agents for increasing the fineness of the cells in flexible foam formulations. However, the cyclic carbonates are effective only in amounts of the same order of magnitude as the polyether siloxane and additionally have the disadvantage of being volatile components which vaporize from the finished foam.

EP-A-0 976 781 described the combined use of polyether siloxanes and salts of organic acids. The cells become finer even at low concentrations, but the solubility of the salts is relatively limited so that the use of water as cosolvent becomes necessary. The use of such combinations is therefore restricted to hydrolysis-stable polyether siloxanes. Furthermore, water contributes to the blowing reaction with isocyanates and may, depending on the concentration used, have to be taken into account in the formulation calculation.

U.S. Pat. No. 4,520,160 describes a process for preparing polyether siloxanes in the presence of fatty alcohols. The latter prevent gel formation during the preparation. The resulting products are preferably used as emulsifiers in cosmetic applications. The document also mentions the in-principle possibility, documented by means of an example, of use in polyurethane foams, but liquid $CO_2$ applications are not mentioned. The use of the product described has, according to this document, no negative influence on the applications mentioned. On the basis of the information provided, the experiment described using a mixture of a polyether siloxane having an SiC structure and isostearyl alcohol gives an open-celled foam whose properties are equal to or better than a foam resulting from a comparative experiment in which isopropyl alcohol is used in place of isostearyl alcohol. Specific criteria for the assessment are not mentioned. In particular, no information on cell structure is given. The foam is only described by the characterization "good foam". Analysis of the example leaves the question of which class of polyurethane compounds is being addressed largely open, since, for example, the polyol type is not defined. The catalyst employed is the organotin compound dibutyltin dilaurate (DBTDL) which could indicate an HR slabstock application. DBTDL is frequently used in flexible foam applications exclusively in HR slabstock and not in conventional slabstock; the latter application requires tin octoate as catalyst. DBTDL is additionally employed in the production of rigid foams and also of elastomers/shoe soles, or classes of polyurethane different from flexible foams.

Our attempts to repeat the example lead not to a flexible foam but to a prepolymer-like elastomer without foam character. The use of a defined amount of water and amine catalysts would be absolutely necessary for producing a flexible foam.

Neither water nor amine catalyst are mentioned in the example; the product is thus not a flexible foam. The foam parameters described for the products of the experiment, e.g. foam height and air permeability, are thus not comprehensible.

The present invention relates to formulations for producing flexible polyurethane foams, by which are meant both conventional flexible polyether foams and flexible polyether foams produced with the aid of liquid $CO_2$ technology.

Conventional flexible polyether foams are produced using as catalyst, apart from a tertiary amine, at least one of the following:

a) a metal salt of an organic acid, for example an alkali metal, alkaline earth metal, Al, Sn, Pb, Mn, Co, Bi or Cu salt of an organic acid such as octanoic acid, ricinoleic acid, acetic acid, oleic acid, lauric acid or hexanoic acid;

b) alkoxides and phenoxides of various metals, e.g. $Ti(OR)_4$, $Sn(OR)_4$, $Sn(OR)_2$, $Al(OR)_3$, where R are alkyl or aryl radicals;

c) chelate complexes of various metals with acetylacetone, benzoylacetone, trifluoroacetylacetone, ethyl acetoacetate, salicylaldehyde, cyclopentanone-2-carboxylate, acetylacetonimine, bisacetylacetone alkylenimines, salicylaldimine and the like, with possible metals being Be, Mg, Zn, Cd, Pb, Ti, Zr, Sn, As, Bi, Cr, Mo, Mn, Fe, Co, Ni or ions such as $MoO_2^{++}$ and $UO_2^{++}$ and the like;

d) acidic metal salts of strong acids, e.g. iron chloride, tin chloride, antimony trichloride and bismuth chloride or nitrate.

The polyols suitable for flexible foams are usually polyether polyols as are described, for example, in U.S. Pat. No. 3,346,557 and polymer polyols as are described, for example, in U.S.-Re-28,715 and U.S. Pat. No. 3,346,557, U.S. Pat. No. 3,823,201, U.S. Pat. No. 3,850,861, U.S. Pat. No. 4,454,255, U.S. Pat. No. 4,458,038, U.S. Pat. No. 4,50,194, U.S. Pat. No. 4,390,645 and also U.S. Pat. No. 4,431,754. The polyols which are preferably employed are trifunctional and have predominantly secondary OH groups.

OBJECTS OF THE INVENTION

It is an object of the present invention to provide, inter alia, improved stabilizer systems in the production of flexible polyurethane foams.

DESCRIPTION OF THE INVENTION

It has surprisingly been found that synergistically acting mixtures of polyether siloxanes with small amounts (from 0.1 to about 30%, preferably from about 5 to about 10%,. based on the polyether siloxanes) of branched fatty alcohols and derivatives thereof have a significantly more effective influence on reducing the size of the cells than do the polyether siloxanes alone. The simultaneous use of the constituents of the mixture is of critical importance. Separate introduction of the branched fatty alcohol, for example via the polyol component, does not lead to the desired effect. The mixtures claimed may further comprise solvents such as a monool, diol or triol of a polyether, a glycol having a low molecular weight or a nonionic surfactant. The solvents themselves have no influence on the surface-active properties of the polyether siloxane in the flexible foam formulation per se, but represent a material which is chemically reactive in the polyurethane formulation and may be present in the mixture claimed.

Polyether Siloxanes:

The polyether siloxanes on which the present invention is based are polysiloxane-polyoxyalkylene copolymers comprising modified polyoxyalkylene building blocks.

The invention, in principle, relates to all structures which can be used generally in the production of flexible polyurethane foams. However, an important factor for the synergistic action of the two components of the mixture is the use of a polyether siloxane which preferably has a certain nucleating action, i.e. gives a satisfactory cell structure even when used alone. In contrast, polyether siloxanes which when used alone give a coarse cell structure frequently do not allow production of synergistically active mixtures in the sense of the invention.

For example, hydrophobic stabilizers are particularly suitable for achieving a fine cell structure, while on the other hand hydrophilic representatives lead, as a result of their structure, to a rather coarse cell when employed alone or in a mixture with the alcohol used according to the invention.

The polyoxyalkylene block can be linked to the polysiloxane via a hydrolysis-stable SiC bond or via a less hydrolysis-stable SiOC bond.

The number of siloxane units in the polysiloxane and the number of possible linkages with the polyoxyalkylene can be altered in virtually any desired way.

Polysiloxane-polyoxyalkylene block copolymers are described in numerous publications.

For example, DE -A-15 70 647 describes SiOC-linked polyether siloxanes. The preparation of this class of polyether siloxanes is described in, for example, DE-A-10 12 602, DE-A-10 40 251, DE-A-11 20 147and U.S. Pat. No. 3,115,512.

The preparation of SiC-linked polysiloxane-polyoxyalkylene block copolymers is described, for example, in U.S. Pat. No. 2,846,458 and in DE-A-12 20 615 and DE-A-11 53 166.

The polyether siloxanes used in the present invention have the formula I,

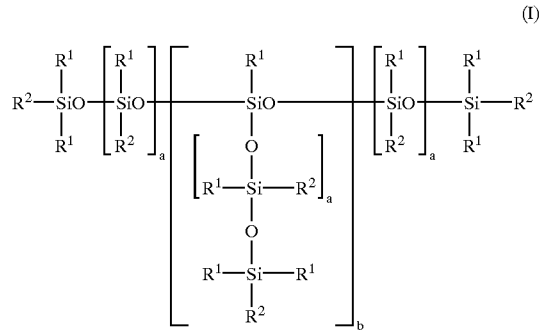

where the radicals
$R^1$ are alkyl radicals or aryl radicals,
$R^2$ are $R^1$ and/or $R^3$ and/or $R^4$,
$R^3$ is a polyether radical of the formula II

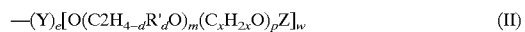

with the proviso that
e=0 to 1,
w=to 4,
d=1 to 3,
m≧1,
x=2 to 4, whereby x is 2, 3 and/or 4 in the same polyether radical; i.e., x is such that a polyether radical may contain $C_2H_4O-$, $C_3H_6O-$ and $C4H_8O$ units either individually or in combination, and p≧1, and Y is a (w+1)-valent hydrocarbon radical which may be branched, R' is selected from the group consisting of monovalent, aliphatic or aromatic hydrocarbon radicals preferably having from 3 to 18 carbon atoms, Z is hydrogen or a monovalent organic radical including an acyl radical, the sum m+p=1 to 150, $R^4$ is a polyether radical of the formula III

  (III)

with the proviso that f=0 or 1, x=2 to 4, g=1 to 4 and r≧1,

F is a (g+1)-valent hydrocarbon radical which may be branched, a is from 1 to 100 when b is from 6 to 8, a is from 1 to 200 when b is from 3 to 6, a is from 1 to 300 when b is from 0 to 3, b 0 to 8.

For the purposes of the present invention, particular preference is given to using polysiloxanes of the formula I in which the indices e and/or f=0. These are accordingly SiOC structures.

For the purposes of the present invention, particular preference is given to using polyether siloxanes of the formula I in which $R^2$ in at least one case is $R^3$, with the proviso that m>p.

Alternatively, preference is in the same way given to using polysiloxanes of the formula I in which the indices e and f=1. These are accordingly SiC structures.

The alcohols and derivatives thereof on which the invention is based are compounds of the formula IV

R—CH$_2$—O—R'  (IV)

where

R=a branched alkyl radical having at least 7 carbon atoms and preferably up to 26 carbon atoms and R'=H, acyl or $R^3$ as defined above.

The branched alcohols and derivatives of the formula IV used in the present invention have an alkyl chain R of at least 8 carbon atoms, with the proviso that the chain has at least one branching point.

The alcohols and derivatives used do not have to have surfactant character in order to achieve the effect produced according to the invention.

Examples of compounds claimed are the commercially available Guerbet and Ziegler alcohols and also naturally branched oxo and isotridecyl alcohols.

For the purposes of the present invention, particular preference is given to using the mixture of polysiloxane of the formula I and branched alcohol in the production of flexible polyurethane foams comprising liquid carbon dioxide as blowing agent.

For the purposes of the present invention, particular preference is given to using the mixtures of polysiloxane of the formula I and branched alcohol and derivatives thereof of the formula IV in an amount of from about 0.3 to about 3%, based on the flexible polyurethane foam formulation.

The present invention further provides mixtures of organofunctional modified polysiloxanes of the formula I

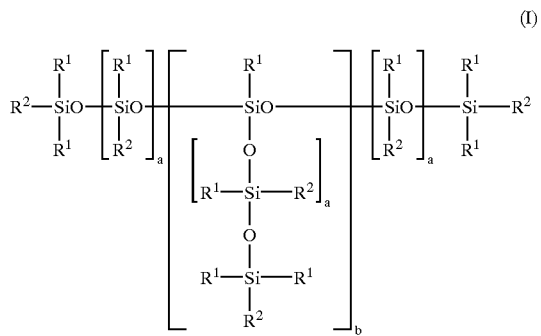  (I)

where the radicals $R^1$ are alkyl radicals or aryl radicals, $R^2$ are $R^1$ and/or $R^3$ and/or $R^4$, $R^3$ is a polyether radical of the formula II

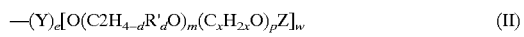  (II)

with the proviso that e=0 to 1, w=1 to 4, d=1 to 3, m≧1, x=2 to 4, whereby x is 2, 3 and/or 4 in the same polyether radical; i.e., x is such that a polyether radical may contain $C_2H_4O-$, $C_3H_6O-$ and $C_4H_8O$ units either individually or in combination, and p≧1, and Y is a (w+1)-valent hydrocarbon radical which may be branched, R' is selected from the group consisting of monovalent, aliphatic or aromatic hydrocarbon radicals, preferably having from 3 to 18 carbon atoms, Z is hydrogen or a monovalent organic radical including an acyl radical, the sum m+p=1 to 150, $R^4$ is a polyether radical of the formula III

  (III)

with the proviso that f=0 or 1, x=2 to 4, g=1 to 4and r≧1,

F is a (g+1)-valent hydrocarbon radical which also may be branched, a is from 1 to 100 when b is from 6 to 8, a is from 1 to 200 when b is from 3 to 6, a is from 1 to 300 when b is from 0 to 3, b=0 to 8, with the proviso that at least one of the indices e and/or f=0, and branched alcohols and derivatives thereof of the formula IV

R—CH$_2$—O—R'  (IV)

where

R=a branched alkyl radical, preferably having from 7 to 26 carbon atoms and

R'=H, acyl or $R^3$ as defined above.

EXAMPLES

A flexible polyurethane foam was produced in an open wooden box having dimensions of 27×27 cm and a wall height of 27 cm by foaming a polyurethane formulation comprising the following constituents:

100 parts of a trifunctional polypropylene glycol having an OH number of 56 (Desmophen® 7186)

4.05 parts of water 0.15 part of Tegoamin®DMEA 0.05 part of N-ethylmorpholine 0.2 part of tin octoate 3.0 parts of a physical blowing agent (dichloromethane) and a 1.12 molar amount, based on hydroxyl groups present in the formulation, of isocyanate groups in the form of the commercially available 80:20 mixture of the 2,4- and 2,6-isomers of tolylene diisocyanate designated as T 80.

As foam-stabilizing agent, a silicone polyether copolymer of the trade name Tegostab B 8123 which is obtainable by hydrosilylation of siloxanes containing Si-H groups with allyl-initiated polyethers and corresponds to an SiC-polyether siloxane as described in U.S. Pat. No. 5,321,051 for stabilizing the resulting foams was used. In the examples according to the invention, this stabilizer was blended with small amounts of a branched fatty alcohol, while in the comparative experiments which are not according to the invention the pure product or the mixture with blending components was used or the branched alcohol was not blended with the stabilizer but added separately to the formulation, for example to the polyol. After curing of the foam, the foam body obtained was cut horizontally and the cell structure found on the cut surface at a height of 15 cm above the bottom of the foam was evaluated. Evaluation criteria were the number of cells/cm and the regularity of the cell structure obtained. In addition, the backpressure produced when 8 liters per minute are passed through the foam sample via a circular feed line having a diameter of 2 cm was determined as a measure of the open cell content of the foams obtained. The lower the backpressure measured, the more open-celled is the foam obtained.

The following results were obtained:

In these tests, a formulation analogous to the above example was foamed with 4.8 parts of water and 2 parts of $CO_2$ on a Novaflex™ unit. As stabilizer, a highly active stabilizer as disclosed in EP-A-0 585 771 was used. In the example according to the invention, isostearyl alcohol was used as component in the stabilizer. In the comparative example, the isostearyl alcohol was replaced by dipropylene glycol. The cell structure of the foam was subsequently assessed and assigned an evaluation on the scale defect-free, slightly defective, moderately defective, defective or highly defective.

| Composition of the stabilizer mixture | Cell structure |
| --- | --- |
| 0.9 part of Tegostab B 8123 + 0.5 part of dipropylene glycol | moderately defective |
| 0.9 part of Tegostab B 8123 + 0.4 part of dipropylene glycol + 0.1 part of isostearyl alcohol | defect-free |

It can be seen that the effect of an improvement in the cell fineness when using a branched alcohol also occurs under the conditions of foaming by means of liquid $CO_2$ as blowing agent.

The above description of the invention is intending to be illustrative and not limiting. Various changes or modifications in the embodiments described may occur to those skilled in the art. These changes can be made without departing from the scope or spirit of the invention.

What is claimed is:

1. A process for producing flexible polyurethane foams which comprises reacting a polyol and an isocyanate in the presence of water, optionally a blowing agent and a mixture comprising:

i) at least one organofunctionally modified polysiloxane of the formula I,

| Ex. | Concentration of Tegostab B 8123 [parts] | Additive 1/amount [parts] | Additive 2/amount [parts] | Cell structure | Cell fineness [number of cells per cm] | Back-pressure [mm of water] |
| --- | --- | --- | --- | --- | --- | --- |
| Comp. 1 | 0.38 | none | — | slightly irregular | 6 | 33 |
| Comp. 2 | 0.38 | dipropylene glycol/0.22 | — | Slightly irregular | 7 | 23 |
| Comp. 3 | 0.38 | dipropylene glycol/0.22 | isostearyl alcohol separately added 0.06 | Slightly irregular | 6–7 | 15 |
| Comp. 4 | 0.38 | dipropylene glycol/0.16 | Propylene carbonate/0.06 | slightly irregular | 10 | 17 |
| Ex. 1 | 0.38 | dipropylene glycol/0.16 | isostearyl alcohol/0.06 | regular | 14 | 21 |
| Ex. 2 | 0.38 | dipropylene glycol/0.16 | isododecyl alcohol/0.06 | regular | 13–14 | 19 |

It can clearly be seen that the use of branched alcohols as component of a flexible foam stabilizer has a surprisingly positive effect on the cell fineness and regularity of the polyurethane foams obtained. This effect could also be demonstrated in machine tests using liquid, pressurized $CO_2$ as blowing agent (corresponding to the CarDio®, Novaflex™ or Beamech™ process).

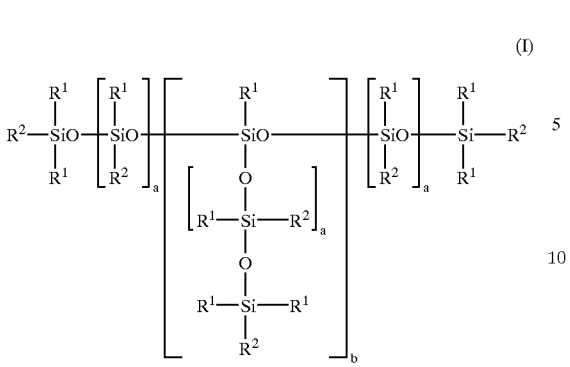 (I)

where the radicals
R¹ are alkyl radicals or aryl radicals,
R² are R¹ and/or R³ and/or R⁴,
R³ is a polyether radical of the formula II

 (II)

with the proviso that
e=0 to 1,
w=1 to 4
d=1 to 3,
m≧1,
x=2 to 4, whereby x may be 2, 3, or 4 in the same polyether radical, and
p≧1, and
Y is a (w+1)-valent hydrocarbon radical which may be branched,
R' is selected from the group consisting of monovalent, aliphatic and
aromatic hydrocarbon radicals
Z is hydrogen or a monovalent organic radical, the sum m+p=1 to 150,
R⁴ is a polyether radical of the formula III

 (III)

with the proviso that
f=0 or 1,
x=2 to 4,
g=1 to 4 and
r≧1,
F is a (g+1)-valent hydrocarbon radical which may be branched,
a is from 1 to 100 when b is from 6 to 8,
a is from 1 to 200 when b is from 3 to 6,
a is from 1 to 300 when b is from 0 to 3,
b=0 to 8 and ii) at least one branched alcohol and derivatives thereof of the formula

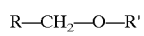 (IV)

where
R=a branched alkyl radical having at least 7 carbon atoms and
R'=H, acyl or R³ as defined above.

2. The process according to claim 1, wherein the mixture comprises
i) at least one organofunctionally modified polysiloxane of the formula I where the radicals
R¹ are alkyl radicals or aryl radicals,
R² are R¹ and/or R³ and/or R⁴,
R³ is a polyether radical of the formula II

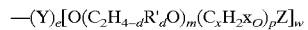 (II)

with the proviso that
e=0 to 1,
w=1 to 4,
d=1 to 3
m≧1,
x=2 to 4, whereby x is 2, 3 and/or 4 in the same polyether radical
p≧1, and
Y is a (w+1)-valent hydrocarbon radical which may be branched,
R' is selected from the group consisting of monovalent, aliphatic and aromatic hydrocarbon radicals, each having from 3 to 18 carbon atoms,
Z is hydrogen or a monovalent organic radical, the sum m+p=1 to 150,
R⁴ is a polyether radical of the formula III

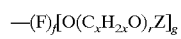 (III)

with the proviso that
f=0 or 1,
x=2 to 4,
g=1 to 4 and
r≧1,
F is a (g+1)-valent hydrocarbon radical which may be branched,
a is from 1 to 100 when b is from 6 to 8,
a is from 1 to 200 when b is from 3 to 6,
a is from 1 to 300 when b is from 0 to 3,
b=0 to 8, ii) compounds of the formula IV

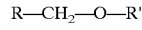 (IV).

3. The process as claimed in claim 1, wherein e and/or f in the polysiloxane of the formula I is 0.

4. The process as claimed in claim 1, wherein e and f in the polysiloxane of the formula I is 1.

5. The process as claimed in claim 4, wherein R² in at least one case is R³ in the polyether siloxane of the formula I, with the proviso that m>p.

6. The process as claimed in claim 1, which comprises blowing agent.

7. The process as claimed in claim 1, wherein branched alcohol is a Guerbet or Ziegler alcohol.

8. The process according to claim 1, wherein the alcohol is a branched oxo or isotridicyl alcohol.

9. The process as claimed in claim 1, wherein the alcohol and derivatives thereof of the formula IV is present in an amount of from about 0.1 to about 30% by weight, based on the amount of polysiloxanes of the formula I.

10. The process as claimed in claim 1, wherein the mixture comprising the polysiloxane and branched alcohol is present in an amount of from about 0.3 to about 3%, based on the flexible polyurethane foam formulation.

11. The process as claimed in claim 6, wherein the blowing agent is pressurized carbon dioxide.

12. A process for producing flexible polyurethane foams which comprises reacting a polyol and an isocyanate in the presence of a catalyst, optionally a blowing agent, and a mixture comprising:
i) at least one organofunctionally modified polysiloxane of the formula I,

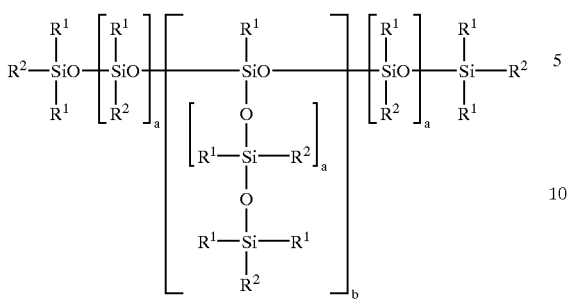 (I)

where the radicals
$R^1$ are alkyl radicals or aryl radicals,
$R^2$ are $R^1$ and/or $R^3$ and/or $R^4$,
$R^3$ is a polyether radical of the formula II

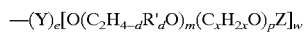 (II)

with the proviso that
e=0 to 1,
w=1 to 4,
d=1 to 3,
m≧1,
x=2 to 4, whereby x may be 2, 3, or 4 in the same polyether radical, and
p≧1, and
Y is a (w+1)-valent hydrocarbon radical which may be branched,
R' is selected from the group consisting of monovalent, aliphatic and aromatic hydrocarbon radicals
Z is hydrogen or a monovalent organic radical, the sum m+p=1 to 150,
$R^4$ is a polyether radical of the formula III

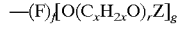 (III)

with the proviso that
f=0 or 1,
x=2 to 4,
g=1 to 4 and
r≧1,
F is a (g+1)-valent hydrocarbon radical which may be branched,
a is from 1 to 100 when b is from 6 to 8,
a is from 1 to 200 when b is from 3 to 6,
a is from 1 to 300 when b is from 0 to 3,
b=0 to 8 and ii) at least one branched alcohol and derivatives thereof of the formula

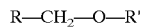 (IV)

where
R=a branched alkyl radical having at least 7 carbon atoms and
R'=H, acyl or $R^3$ as defined above;
wherein the catalyst is at least one compound selected from the group consisting of a metal salt of an organic acid, an alkoxide or phenoxide of a metal, a chelate complex of a metal, and an acidic metal salt of a strong acid.

13. The process according to claim 12, wherein the a metal salt of an organic acid is an alkali metal, alkaline earth Metal, or an Al, Sn, Pb, Mn, Co, Bi or Cu salt of an organic acid selected from the group consisting of octanoic acid, ricinoleic acid, acetic acid, oleic acid, lauric acid and hexanoic acid;

the alkoxide or phenoxide of a metal is $Ti(OR)_4$, $Sn(OR)_4$, $Sn(OR)_2$, or $Al(OR)_3$, where R are alkyl or aryl radicals;

the chelate complex of a metal is the chelate of a complex metal with acetylacetone, benzoylacetone, trifluoroacetylacetone, ethyl acetoacetate, salicylaldehyde, cyclopentanone-2-carboxylate, acetylacetonimine, bisacetylacetone alkylenimines, salicylaldimine where the metal is Be, Mg, Zn, Cd, Pb, Ti, Zr, Sn, As, Bi, Cr, Mo, Mn, Fe, Co, or Ni or ions selected from the group consisting of $MoO_2^{++}$ and $UO_2^{++}$;

the acidic metal salt of strong acids is iron chloride, tin chloride, antimony trichloride, bismuth chloride or bismuth nitrate.

* * * * *